M. G. HUBBARD.
Harvester Cutter.
No. 16,441.
Patented Jan. 20, 1857.
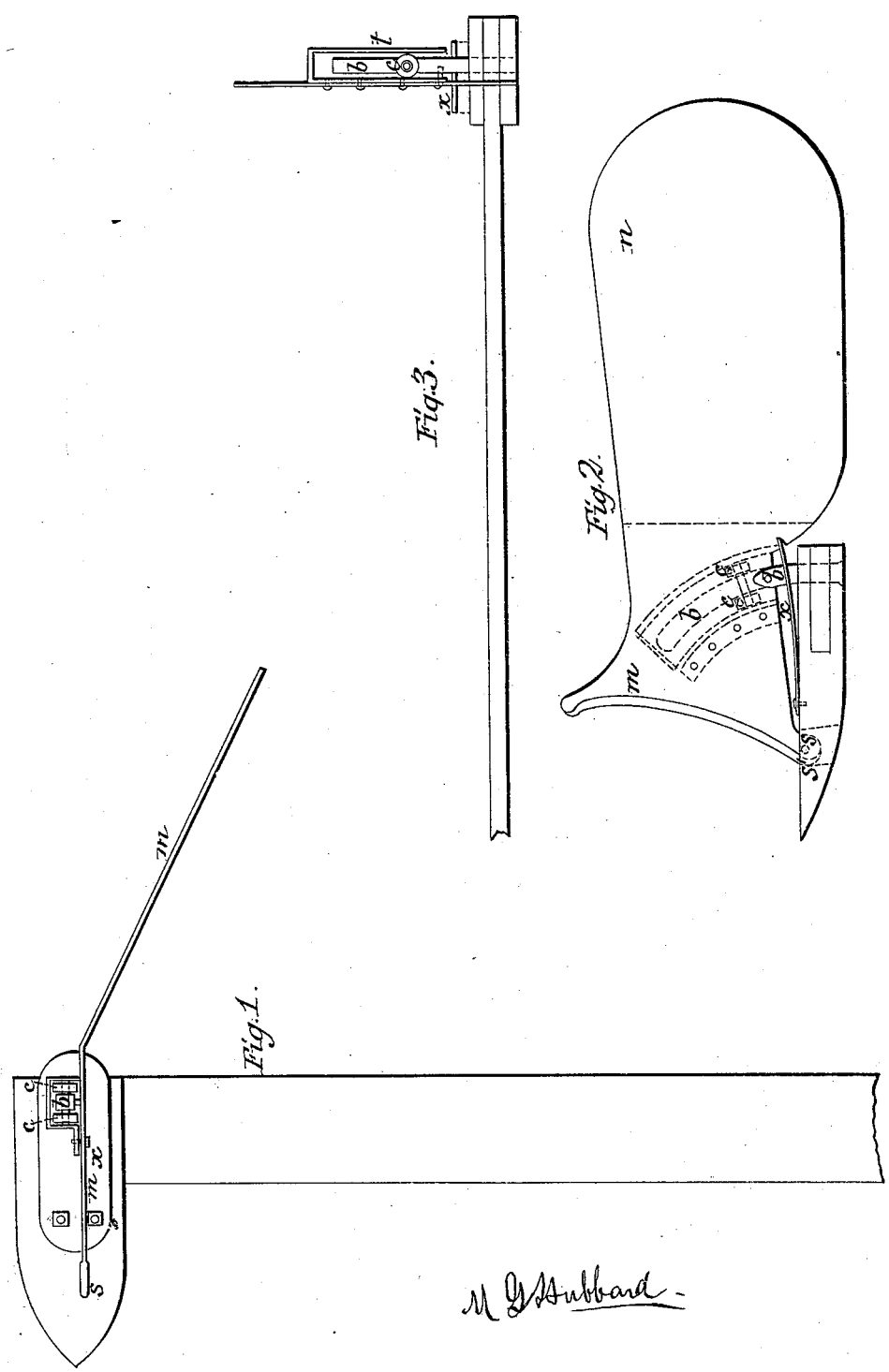
M. G. Hubbard

UNITED STATES PATENT OFFICE.

M. G. HUBBARD, OF PENN YAN, NEW YORK.

IMPROVEMENT IN HARVESTERS.

Specification forming part of Letters Patent No. 16,441, dated January 20, 1857.

*To all whom it may concern:*

Be it known that I, M. G. HUBBARD, of Penn Yan, in the county of Yates and State of New York, have invented a new and useful Improvement in Grass-Harvesting Machines; and I do hereby declare the following to be a full, clear, and exact description thereof, reference being had to the accompanying drawings, in which—

Figure 1 is a top plan. Fig. 2 is an elevation of the shoe and combined cutter and track-clearer. Fig. 3 is a rear elevation of the same.

My improvements in grass-harvesters herein described consist in combining the track-clearer and the cutting-standard, and their general construction and arrangement.

I have found in the operation of grass-harvesters as at present constructed a great difficulty in so removing the grass of a previous swath as to prevent its clogging and impairing the operation of the machine in cutting the next swath. All devices that I have ever seen for removing this difficulty have failed in their object in precisely the cases where such a device is most needed, such as heavy tangled grass, &c. Experience in the working of these machines seems clearly to demonstrate that a track-clearer to accomplish the objects aimed at should be held down to the ground with some greater force than its own weight, and as it seemed necessary that the additional force should be yielding, I applied a spring to a peculiarly-constructed device, and found material advantages resulting therefrom; but further experiment indicated that this arrangement, while it accomplished the objects aimed at in grass peculiar to some localities, would fail while working in the heavy tangled grass peculiar to other localities, for the reason that in such cases when the spring was sufficiently powerful to hold the track-clearer to the ground it would have too great a tendency to raise the outer end of the finger-bar from the ground. It therefore became necessary to construct some new device which would enable me to dispense with the spring, or at least so aid its action as to avoid the necessity of using so powerful a spring. Experience had further indicated the necessity for a cutting-standard projecting perpendicularly from the outer shoe for the purpose of separating the cut grass from the standing grass where it was heavy and tangled together, and thus it became evident that, as the cutting-standard and track-clearer were both most needed under precisely the same circumstances, if they could both be arranged with respect to each other so that the one should aid the other in its operation the great object might be attained. To accomplish this result, I form the cutting-standard and track-clearer in one piece, as clearly seen at Fig. 2, where the cutter $m$ rises up in a proper curve in front from its joint $s$ in the shoe to an elevation somewhat above the inclined clearer behind. From thence the cutter $m$ extends straight back at right angles with the finger-bar, and rests against the fulcrum-post $b$, by which it is supported, from whence it bends inward and backward to form the clearer $n$, and I hinge this cutter and clearer at the front end of the outer shoe in such a manner that the action of heavy tangled grass against the cutting-standard will cause a downward pressure upon the track-clearer, and I also sometimes attach a light spring, $x$, to the front end of the shoe, (with screws, so that its pressure may be varied,) and extend it back to a recess or notch in the track-clearer, so that its downward pressure will aid the weight of the track-clearer in removing the grass in cases where it is light and not tangled, and where of cousre there would be no force exerted upon the cutting-standard.

I have seen track-clearers in operation that were hinged to the rear edge of the rack-piece or finger-bar behind the shoe like Ketchum's and others, in which the whole lateral pressure of the grass against the track clearer was sustained by the hinge, and thereby so great an amount of friction caused in the hinge as to prevent the effectual operation of the track-clearer, because when raised by an obstacle the grass pressing against it would cause so much friction and binding in the hinge as to prevent its immediate descent. An effort has been made to obviate this difficulty by making a very wide hinge, in which case the front end of the track-clearer was widened by splicing a piece horizontally onto its side, and thus producing a wide bearing to sustain the lateral pressure against the track-clearer; but this device involved a very serious objection, as the grass would accumulate and pile up upon this widened projection, and thereby defeat the successful operation of the track-clearer, besides which the front end of the track-clearer has always been so low in all previous devices as to allow a portion of the grass to fall over it, and thus the cut grass would be but imperfectly separated from the standing grass. I find that I have entirely overcome these difficulties by forming a track-clearer as described, and hinging it at the front end of the shoe, (where it at once rises in form of a cutter,) and sustaining its lateral pressure by the fulcrum-post $b$. On this post there may be anti-friction rollers, as seen at $c$; but it will operate in most cases without the rollers. By this arrangement I avoid the great binding and friction in the hinge, caused by the lateral pressure of the track-clearer by the great purchase which it has on the hinge in the devices referred to, and at the same time present but a thin edge with perpendicular sides to the grass, and attain an easy rise and fall at all times, and a constant adhesion to the ground proportionate to the kind and condition of the grass that is being cut. To avoid any projections that might be liable to catch and tangle the loose grass, I extend the cutting-edge of the perpendicular cutter below the top surface of the shoe, as shown at $s$, Fig. 2, and form a cap entirely around the fulcrum-post at $t$, so as to effectually inclose it, and thus the whole apparatus presents a uniform exterior and involves no objections to defeat its objects.

By making a track-clearer and cutter combined in this bent form and hinging it front of its angle I find that it will sustain a much greater lateral force than if it extended from a hinge in a direct line, and I also find an advantage in hinging it in front of the finger-bar, in the fact that, the track-clearer passing over a small obstacle near the shoe, the outer end of it does not rise so high in permitting the obstacle to pass under it, and therefore will descend in less time, &c.

Having thus fully described my improvement in grass-harvesters, what I claim therein as new, and for which I desire to secure Letters Patent, is—

1. The combined cutting-standard and inclined track-clearer, when constructed and operating substantially in the manner and for the purpose set forth.

2. Hinging the cutting-standard and track-clearer forward of the finger-bar and near the front end of the shoe, and supporting the same against lateral pressure by means of the fulcrum-post $b$, as above specified.

M. G. HUBBARD.

In presence of—
   E. ADLER,
   J. A. RERMAN.